(12) United States Patent
Zhang et al.

(10) Patent No.: US 12,402,087 B2
(45) Date of Patent: Aug. 26, 2025

(54) METHOD AND APPARATUS FOR SENDING ACKNOWLEDGEMENT FRAME, STATION, AND STORAGE MEDIUM

(71) Applicant: ESPRESSIF SYSTEMS (SHANGHAI) CO., LTD., Shanghai (CN)

(72) Inventors: Yuanyuan Zhang, Shanghai (CN); Shengdong Gu, Shanghai (CN); Junyi Zhang, Shanghai (CN)

(73) Assignee: ESPRESSIF SYSTEMS (SHANGHAI) CO., LTD., Shanghai (CN)

( * ) Notice: Subject to any disclaimer, the term of this patent is extended or adjusted under 35 U.S.C. 154(b) by 321 days.

(21) Appl. No.: 18/260,215

(22) PCT Filed: Dec. 31, 2021

(86) PCT No.: PCT/CN2021/143956
§ 371 (c)(1),
(2) Date: Jun. 30, 2023

(87) PCT Pub. No.: WO2022/144006
PCT Pub. Date: Jul. 7, 2022

(65) Prior Publication Data
US 2024/0080779 A1    Mar. 7, 2024

(30) Foreign Application Priority Data
Dec. 31, 2020    (CN) .......................... 202011633253.4

(51) Int. Cl.
H04W 4/00          (2018.01)
H04L 5/00          (2006.01)
(Continued)

(52) U.S. Cl.
CPC ......... *H04W 52/367* (2013.01); *H04L 5/0053* (2013.01); *H04W 52/243* (2013.01);
(Continued)

(58) Field of Classification Search
None
See application file for complete search history.

(56) References Cited

U.S. PATENT DOCUMENTS 11,212,750 B1 *  12/2021  Ali ........................ H04W 52/18
2015/0139162 A1    5/2015  Dinan
(Continued)

FOREIGN PATENT DOCUMENTS

CN        102404837 A      4/2012
CN        105532044 A      4/2016
(Continued)

OTHER PUBLICATIONS

Office Action with Search Report from Corresponding Chinese Priority Application No. 202011633253.4 Jul. 22, 2022.

*Primary Examiner* — Bob A Phunkulh
(74) *Attorney, Agent, or Firm* — Aird & McBurney LP

(57) ABSTRACT

Provided is a method sending an acknowledgment frame, wherein by receiving a data frame sent by the first access point and calculating the minimum transmission power of the present station, the maximum transmission power of the station is used as the initial transmission power; the pre-established queue of the maximum transmission powers of the overlapping basic service set is invoked; the queue is a set of maximum transmission powers which does not affect packet reception of one or more second stations and calculated by the first station; the maximum transmission power of the overlapping basic service set allowed in the pre-established queue is traversed sequentially; being greater than or equal to the minimum transmission power, the (Continued)

minimum value among the initial transmission power and one or more maximum transmission powers is taken as the final transmission power; and the acknowledgment frame is sent by using the determined final transmission power.

20 Claims, 6 Drawing Sheets

(51) Int. Cl.
  *H04W 52/24* (2009.01)
  *H04W 52/36* (2009.01)
  *H04W 52/48* (2009.01)
  *H04W 72/044* (2023.01)
  *H04W 72/21* (2023.01)
(52) U.S. Cl.
  CPC ........ *H04W 52/48* (2013.01); *H04W 72/0473* (2013.01); *H04W 72/21* (2023.01)

(56) References Cited

U.S. PATENT DOCUMENTS

| | | | | |
|---|---|---|---|---|
| 2015/0163753 A1* | 6/2015 | Valliappan | .......... | H04W 74/002 370/338 |
| 2015/0282104 A1* | 10/2015 | Damnjanovic | ..... | H04W 52/365 455/522 |
| 2017/0135133 A1* | 5/2017 | Barriac | ................ | H04W 52/50 |
| 2017/0150452 A1* | 5/2017 | Rosa | ................... | H04W 52/226 |
| 2018/0235002 A1* | 8/2018 | Son | ........................ | H04L 27/26 |
| 2018/0317170 A1* | 11/2018 | Cariou | ................. | H04W 52/44 |
| 2018/0343096 A1 | 11/2018 | Kim et al. | | |
| 2019/0021007 A1* | 1/2019 | Zhou | ..................... | H04W 72/21 |
| 2020/0229103 A1* | 7/2020 | Hosseini | ............... | H04W 76/15 |
| 2021/0153026 A1* | 5/2021 | Katabathuni | ......... | H04W 48/20 |
| 2024/0080779 A1* | 3/2024 | Zhang | .................. | H04L 5/0053 |

FOREIGN PATENT DOCUMENTS

| | | |
|---|---|---|
| CN | 108353425 A | 7/2018 |
| CN | 109996323 A | 7/2019 |
| CN | 110719642 A | 1/2020 |
| CN | 111586827 A | 8/2020 |
| CN | 111901858 A | 11/2020 |
| CN | 111953455 A | 11/2020 |
| CN | 112822766 A | 5/2021 |
| WO | 2017131885 A1 | 8/2017 |

* cited by examiner

METHOD AND APPARATUS FOR SENDING ACKNOWLEDGEMENT FRAME, STATION, AND STORAGE MEDIUM

CROSS-REFERENCE TO RELATED APPLICATIONS

This application is the U.S. National Phase Application under 35 U.S.C. § 371 of International Patent Application No. PCT/CN2021/143956 filed on Dec. 31, 2021, which claims priority to Chinese Patent Application CN202011633253.4 filed on Dec. 31, 2020. The disclosures of the aforementioned applications are hereby incorporated by reference in their entireties.

TECHNICAL FIELD

The present application relates to the field of wireless communication technology, and in particular to a method and an apparatus for sending an acknowledgment frame, a station and a computer-readable storage medium.

BACKGROUND

With the advancement of wireless communication technology and the popularity of Internet of Things (IoT) devices, there has been an exponential growth in the number of devices with Wi-Fi communication requirements and functions. The extreme increase in the density of Wi-Fi devices makes the interference among devices more and more serious. Therefore, how to reduce the interference among devices and improve the communication quality of devices under high-density deployment has become a hot research topic in the field of wireless communication.

At present, regarding on how to improve the quality of wireless communication and enhance user experience under high-density deployment conditions, two main problems need to be solved: competition among the same service set (BSS), and interference among different overlapping basic service sets (OBS S).

Technologies such as Multi-User Multiple-Input Multiple-Output (MU-MIMO) and Orthogonal Frequency Division Multiple Access (OFDMA) are widely used, so that an access point (AP) can communicate with multiple stations (STAs) under the same service set (BSS) simultaneously, thereby alleviating the competition conflicts among the stations (STAs) in the same service set (BSS) caused by the distributed coordination function (DCF). For example, the access point (AP) allocates multiple stations (STAs) to different resource units (RU) by sending a broadcast trigger frame within the service set (BSS), and then after SIFS time, all triggered stations (STAs) simultaneously send packets to the access point (AP) on the allocated resource unit (RU) by the uplink OFDMA technology, so as to realize the simultaneous interaction between the access point (AP) and the multiple stations (STAs).

Compared with the competition within the same service set (BSS), the interference under the overlapping basic service set (OBSS) is more complicated. Therefore, the problem of how to reduce the interference to the devices in the overlapping basic service set in the existing art is still required to be solved.

SUMMARY

In order to solve the above problems, the present application provides a method for sending an acknowledgment frame, which is applied to a first station of wireless communication, and the method includes:

receiving a data frame sent by a first access point, and calculating a minimum transmission power of the present station for sending an acknowledgment frame according to the data frame; using a maximum transmission power of the first station at a predetermined rate as an initial transmission power;

invoking a pre-established queue of the maximum transmission powers of an overlapping basic service set; the queue of the maximum transmission powers of the overlapping basic service set being a set of maximum transmission powers which does not affect packet reception of one or more second stations and which is calculated by the first station after receiving a data frame sent by the one or more second stations in the overlapping basic service set;

traversing the maximum transmission powers of the overlapping basic service set allowed in the pre-established queue of the maximum transmission powers of the overlapping basic service set sequentially; on the basis of being greater than or equal to the minimum transmission power, taking a minimum value among the initial transmission power and one or more maximum transmission powers to be determined as a final transmission power; and sending the acknowledgment frame by using the determined final transmission power.

Optionally, after receiving the data frame, the method further includes: determining whether the data frame is a retransmission data frame;

in response to the data frame being a retransmission data frame, sending the retransmission data frame by using the maximum transmission power of the first station at a predetermined rate; and in response to the data frame not being a retransmission data frame, performing a subsequent operation of using the maximum transmission power of the first station at a predetermined rate as the initial transmission power.

Optionally, the queue of the maximum transmission powers of the overlapping basic service set is a queue with a preset length, and the method further includes:

calculating the maximum transmission power which does not affect packet reception of one or more second stations by the first station after receiving the data frame sent by the one or more second stations in the overlapping basic service set;

determining whether data in the queue of the maximum transmission powers of the overlapping basic service set is full;

in response to the data in the queue of the maximum transmission powers of the overlapping basic service set not being full, putting the calculated maximum transmission power into the queue; and in response to the data in the queue of the maximum transmission powers of the overlapping basic service set being full, comparing the maximum value in the queue of the maximum transmission powers of the overlapping basic service set with the currently calculated maximum transmission power, and putting a smaller value of the two into the queue.

Optionally, each maximum transmission power stored in the queue of the maximum transmission powers of the overlapping basic service set has a survival cycle, and upon expiration of the survival cycle, a corresponding maximum transmission power is removed from the queue of the maximum transmission powers of the overlapping basic service set.

Optionally, the calculating the maximum transmission power which does not affect packet reception of one or more second stations by the first station after receiving the data frame sent by the one or more second stations in the overlapping basic service set includes: after receiving the data frame sent by the one or more second stations in the overlapping basic service set, the first station extracting from the data frame a reception characteristics information of the acknowledgment frame, and the reception characteristics information of the acknowledgment frame at least including a transmission power of the current data frame and a maximum allowed interference power of the overlapping basic service set;

determining an actual reception signal power at the time of receiving the data frame;

determining a path attenuation power for sending the data frame according to the transmission power of the current data frame and the actual reception signal power; and calculating the maximum transmission power that does not affect packet reception of the one or more second stations by using the path attenuation power and the maximum allowed interference power of the overlapping basic service set.

Optionally, the calculating the minimum transmission power of the present station for sending an acknowledgment frame according to the data frame includes:

after receiving a data frame sent by the first access point in the present service set, the first station extracting from the data frame a reception characteristics information of the acknowledgment frame, the reception characteristics information of the acknowledgment frame at least including a transmission power of the current data frame, a minimum reception power of the acknowledgment frame and a maximum allowed interference power of the overlapping basic service set;

determining an actual reception signal power at the time of receiving the data frame; determining a path attenuation power for sending the data frame according to the transmission power of the current data frame and the actual reception signal power; and calculating the minimum transmission power at the present station for sending the acknowledgment frame by using the path attenuation power and the minimum reception power of the acknowledgment frame.

Optionally, the reception characteristics information of the acknowledgment frame is carried in a SERVICE field of the data frame transmitted by the station or the access point.

Optionally, the method further includes:

calculating a reception error rate of the acknowledgment frame which is received after the access point sends the data frame;

correcting a minimum reception power of the acknowledgment frame according to a formula of $P_{min\_rx} = P_{min\_rx\_base} + a*E$, based on the calculated reception error rate of the acknowledgment frame; wherein $P_{min\_rx}$ is a corrected minimum transmission power of the acknowledgment frame, $P_{min\_rx\_base}$ is a reference value, a is a constant, and E is the reception error rate of the acknowledgment frame.

The present application further provides an apparatus for sending an acknowledgment frame, which is applied to the first station of wireless communication, and the apparatus includes:

a receiving module configured to receive a data frame sent by a first access point, and to calculate a minimum transmission power of the present station for sending an acknowledgment frame according to the data frame;

an initialization module configured to take a maximum transmission power of the first station at a predetermined rate as an initial transmission power;

an invoking module configured to invoke a pre-established queue of the maximum transmission powers of an overlapping basic service set; the queue of the maximum transmission powers of the overlapping basic service set being a set of maximum transmission powers which does not affect packet reception of one or more second stations and which is calculated by the first station after receiving a data frame sent by the one or more second stations in the overlapping basic service set;

a determining module configured to traverse the maximum transmission powers of the overlapping basic service set allowed in the pre-established queue of the maximum transmission powers of the overlapping basic service set sequentially; on the basis of being greater than or equal to the minimum transmission power, to take a minimum value among the initial transmission power and one or more maximum transmission powers to be determined as a final transmission power; and a sending module configured to send the acknowledgment frame by using the determined final transmission power.

The present disclosure further provides a station including a processor and a memory; the memory is configured to store program instructions;

the processor is configured to perform operations of any one of the methods for sending the acknowledgment frame described above according to the program instructions.

The present disclosure further provides a computer-readable storage medium storing program instructions, which when being executed, perform operations of any one of the methods for sending the acknowledgment frame described above.

The method for sending the acknowledgment frame provided by the present application is applied to the first station of wireless communication, by receiving the data frame sent by the first access point and by calculating the minimum transmission power of the present station for sending the acknowledgment frame according to the data frame; the maximum transmission power of the first station at a predetermined rate is used as the initial transmission power; the pre-established queue of the maximum transmission powers of the overlapping basic service set is invoked; the queue of the maximum transmission powers of the overlapping basic service set is a set of maximum transmission powers which does not affect packet reception of one or more second stations and which is calculated by the first station after receiving a data frame sent by the one or more second stations in the overlapping basic service set; the maximum transmission power of the overlapping basic service set allowed in the pre-established queue of the maximum transmission powers of the overlapping basic service set is traversed sequentially; on the basis of being greater than or equal to the minimum transmission power, the minimum value among the initial transmission power and one or more maximum transmission powers is taken and determined as the final transmission power; and the acknowledgment frame is sent by using the determined final transmission power. The method provided by the present application can dynamically control the transmission power of the acknowledgment frame at the station, thereby reducing interference to the packet reception at the nodes in the overlapping basic service set and improving the quality of communication in the high-density area without affecting the success rate of the original data interaction. In addition, the present application further provides the apparatus for sending the acknowledgment frame, the station and the computer-readable storage medium with the above-mentioned technical advantages.

BRIEF DESCRIPTION OF THE DRAWINGS

In the following, the present application will be further explained on the basis of embodiments with reference to the attached drawings.

DETAILED DESCRIPTION OF THE PREFERRED EMBODIMENTS

The method and the apparatus of the present application will be described in detail below with reference to the accompanying drawings and specific embodiments. It should be understood that the embodiments shown in the accompanying drawings and described hereinafter are merely illustrative and not intended to limit the disclosure.

Acknowledgment frame, represented by ACK/BA, is an important part of the IEEE 802.11 protocol. A transmission rate of the acknowledgment frame is usually low, and thus the transmission time can be tens or even hundreds of microseconds despite of a short frame length. Moreover, with the development of wireless communication technology, the amount of data transmitted per unit time is increasing, and the interference problem of the acknowledgment frame to the overlapping basic service set (OBSS) is also further aggravated.

Figure 1:
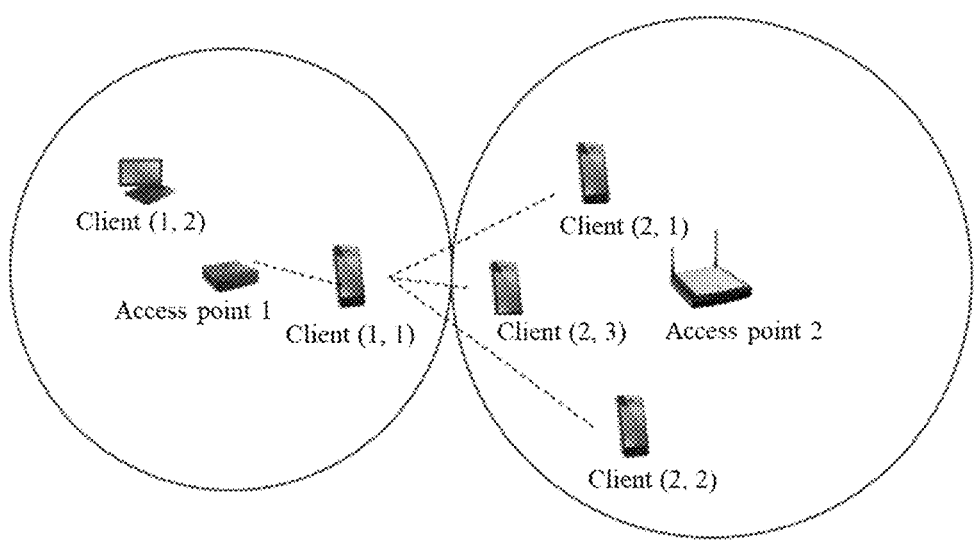
FIG. 1 schematically shows a schematic diagram of interference of an acknowledgment frame at a station to OBS S.

At present, the main solution in the existing technologies to the problem of interference between different service sets is to optimize transmission power of an access point (AP). While this scheme reduces the mutual interference when sending packets between APs, it ignores the inter-OBSS interference caused by a large number of stations (STAs) transmitting acknowledgment packets. In fact, in a dense deployment scenario, the distance between STAs in different service sets (BSSs) is often smaller than the distance between APs, and an uplink acknowledgment packet transmitted by a STA in a certain BSS may affect a downlink packet received by a close STA in an adjacent BSS. In FIG. 1, which shows an interference diagram of the acknowledgment frame at the station to OBSS, APs in the neighboring service sets are generally far apart, while some of the clients are usually close to each other, such as the client (1,1), the client (2,1) and the client (2,3). If the acknowledgment frame sent by the client (1,1) to the access point 1 has a high power, the packet reception at each of the client (2,1) and the client (2,3) will be affected, and vice versa.

Meanwhile, technologies such as Spatial Reuse and BSS Coloring in Wi-Fi 6 introduce a new physical frame format to improve the opportunities of transmitting packets in the dense deployment. Although these technologies can effectively improve the spatial reuse, they do not solve the problem of interference from adjacent BSSs in the existing art. In fact, the acknowledgment frame in the Wi-Fi system usually adopts the more traditional 802.11b/g protocol. Not only that, the new technologies of Wi-Fi 6 require to introduce a new physical frame format, a solution that is costly to implement and has a long lead time, making it difficult to apply on a large scale in a short period of time.

Based on this, this application proposes a mechanism to control a transmission power of an acknowledgment frame based on the existing physical frame format, to solve the problem of interference of the acknowledgment frame to devices in an adjacent BSS in the case of dense deployment.

Figure 2:
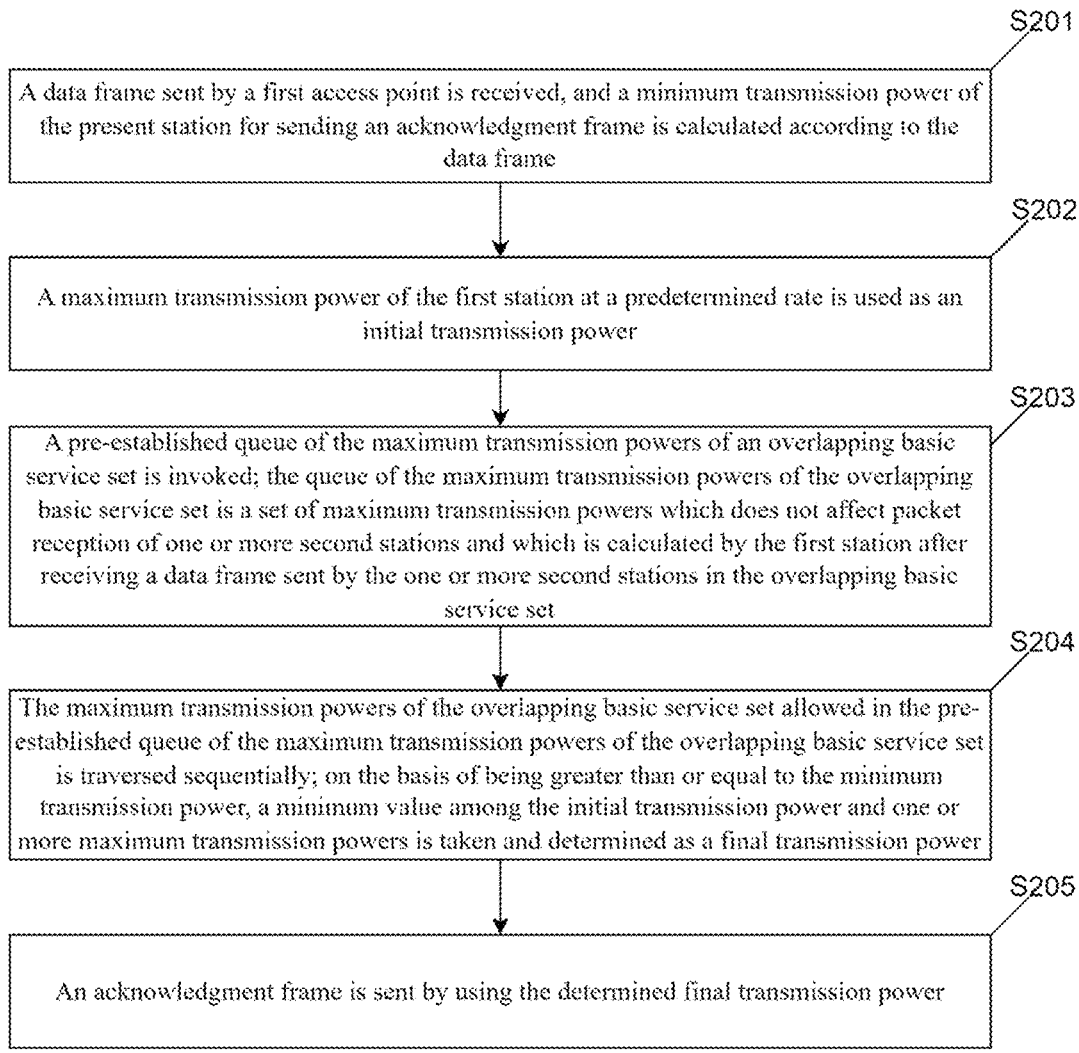
FIG. 2 schematically shows a flow chart of a specific embodiment of a method for sending an acknowledgment frame provided by the present application.

FIG. 2 shows a flow chart of a specific embodiment of a method for sending an acknowledgment frame provided by the present application. This embodiment is applied to a first station of wireless communication, and the method specifically includes the following steps.

At S201, a data frame sent by a first access point is received, and a minimum transmission power of the present station for sending an acknowledgment frame is calculated according to the data frame.

At S202, a maximum transmission power of the first station at a predetermined rate is used as an initial transmission power.

The maximum transmission power of the first station at the predetermined rate is known data, and the maximum transmission power is the power matched with the rate which may ensure the successful reception by the access point.

At S203, a pre-established queue of the maximum transmission powers of an overlapping basic service set is invoked; the queue of the maximum transmission powers of the overlapping basic service set is a set of maximum transmission powers which does not affect packet reception of one or more second stations and which is calculated by the first station after receiving a data frame sent by the one or more second stations in the overlapping basic service set.

At S204, the maximum transmission powers of the overlapping basic service set allowed in the pre-established queue of the maximum transmission powers of the overlapping basic service set is traversed sequentially; on the basis of being greater than or equal to the minimum transmission power, a minimum value among the initial transmission power and the maximum transmission powers of the overlapping basic service set is taken and determined as a final transmission power.

At S205, an acknowledgment frame is sent by using the determined final transmission power.

It can be understood that, as a non-limiting example, the acknowledgment frame in this application may be an ACK or BA. Each station maintains its own queue of the maximum transmission powers of the overlapping basic service set. Data in the queue is a set of the maximum transmission powers which does not affect the packet reception of the one or more second stations and which is calculated after the present station receives the data frame sent by the second station in the overlapping basic service set.

The above-mentioned first station and second station are distinguished in the disclosure for the convenience of description, and the "first" and "second" do not emphasize the meaning of order.

The technical solution of the present application may be applied in an IEEE 802.11 wireless local area network, and the network includes one or more access points (APs) and one or more stations (STAs).

The station may be an apparatus with wireless communication function, such as a user equipment, an access terminal, a remote terminal, a user terminal, a mobile device, and may also be a cellular phone, a handheld device with wireless communication function, a vehicle-mounted device, a wearable device, etc., which is not limited by this embodiment of the present application.

The access point may be any kind of device that has a wireless transceiver function and communicates with a station. The device includes but is not limited to an evolved Node B, a wireless network controller, a Node B, a base station controller, etc., and may also be an antenna panel or a group of antenna panels of a base station in a 5G or 5G system, or may also be a baseband unit or a distributed unit, etc., without limitations herein.

The method provided by the present application is adopted to control the transmission power of the acknowledgment frame, which reduces interference to the packet reception at the nodes in the overlapping basic service set and improves the quality of communication in the high-density area, while ensuring that the acknowledgment frame sent by the station in the IEEE 802.11 wireless local area network is correctly received by the access point.

The method for sending the acknowledgment frame provided by the present application will be described in detail below in conjunction with this specific scenario. In this embodiment, the reception characteristics information of the acknowledgment frame is carried in a SERVICE field of the data frame transmitted by the station or the access point. After receiving the data frame, other stations parse the SERVICE field to obtain the reception characteristics information of the acknowledgment frame, so that the reception information and reception capability of the acknowledgment frame can be informed.

Figure 3:
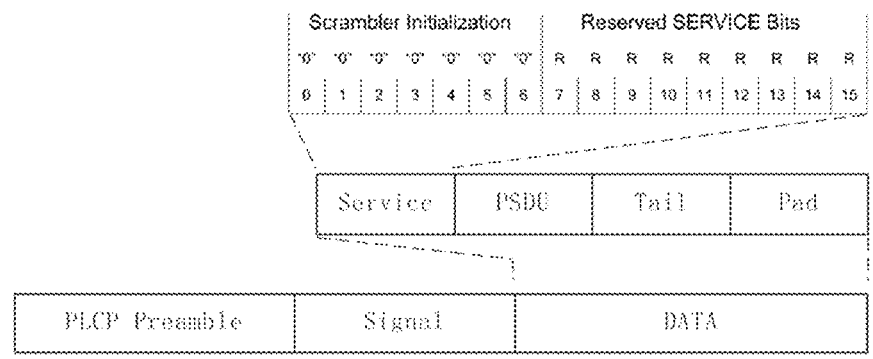
FIG. 3 schematically shows a schematic diagram of IEEE 802.11 OFDM PPDU format.

FIG. 3 shows a schematic diagram of a specific embodiment of the Wi-Fi physical frame and the format of the SERVICE. FIG. 3 shows the IEEE 802.11 OFDM PPDU format. The SERVICE field is located at the beginning of the DATA segment and has a length of 16 bits. The lower 7 bits are forced to be 0, and the upper 9 bits are currently unused. Specifically, the 16-bit SERVICE field in a Wi-Fi physical layer packet header may be encoded as shown in Table 1. In this embodiment, on the basis of existing protocols and physical layer implementations, a reserved space in the physical layer frame header is used to accomplish the control of power consumption with a short implementation cycle and low cost.

TABLE 1

| Position | Bit 15 | Bit 14-12 | Bit 11-7 | Bit 6-0 |
| --- | --- | --- | --- | --- |
| Content | 1 | Info_type | Info_data | 0 |

Among them, Info_type indicates the meaning of subsequent Info_data transmission information, 0 indicates that Info_data is a code of the transmission power of the current data frame, 1 indicates that Info_data is a code of a minimum reception power of the acknowledgment frame, and 2 indicates that Info_data is a code of a maximum allowed interference power of the overlapping basic service set, and the rest of the values are reserved.

Info_data has different meanings depending on the Info_type. If Info_type indicates the code of the transmission power of the current data frame, then the actual transmission power $P_{tx}=-20+2*Info\_data$; if Info_type indicates the code of the minimum reception power of the acknowledgment frame, then the actual minimum reception power is $P_{min\_rx}=-90+2*Info\_data$; if Info_type indicates the code of the maximum allowed interference power of the overlapping basic service set, then the actual maximum interference power is $P_{obss\_max}=-90+2*Info\_data$. Due to the large dynamic range of the actual transmission power, writing the actual transmission power directly would result in a waste of bits. Therefore, in this embodiment, the above formulas are used for expression, by which the actual transmission power is calculated. It can be understood that, in practice, the actual transmission power may also be sent directly, and none of the values in the above formulas are fixed, and this is only a specific example.

Specifically, for the access point device, the transmission power of the current data frame, the minimum reception power of the acknowledgment frame, and the maximum allowed interference power of the overlapping basic service set may be periodically given in turn in the transmitted SERVICE field. For the station device, the transmission power of the current data frame and the maximum allowed interference power of the overlapping basic service set may be periodically given in turn in the transmitted SERVICE field.

After receiving the data frame, the station parses the SERVICE field in the data frame to obtain the reception characteristic information of the acknowledgment frame carried in the SERVICE field. The transmission power can be calculated based on the reception characteristics information of the acknowledgment frame. Specifically, for the two cases that the data frame received by the first station is sent by an access point of the present service set or sent by a station of the overlapping basic service set, the details will be described hereinafter respectively.

Figure 4:
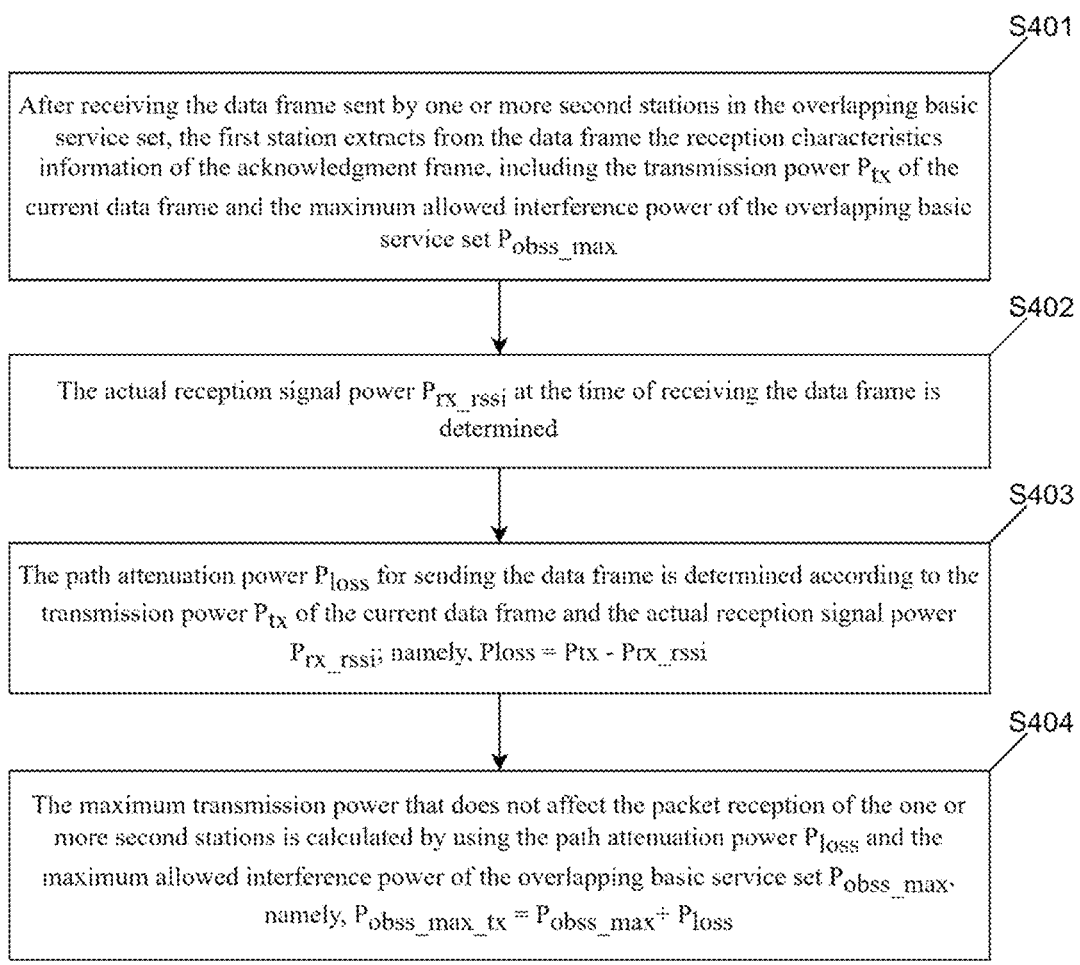
FIG. 4 schematically shows a flow chart of calculating a maximum transmission power.

If the data frame received by the first station is sent by a station in the overlapping basic service set, as mentioned above, the SERVICE field transmitted by the station carries the transmission power of the current data frame and the maximum allowed interference power of the overlapping basic service set. Referring to FIG. 4, which shows a flow chart of calculating the maximum transmission power in the case that the data frame is transmitted by a station in the overlapping basic service set. The process includes the following steps.

At S401, after receiving the data frame sent by one or more second stations in the overlapping basic service set, the first station extracts from the data frame the reception characteristics information of the acknowledgment frame, including the transmission power $P_{tx}$ of the current data frame and the maximum allowed interference power of the overlapping basic service set $P_{obss\_max}$.

At S402, the actual reception signal power $P_{rx\_rssi}$ at the time of receiving the data frame is determined.

At S403, the path attenuation power $P_{loss}$ for sending the data frame is determined according to the transmission power $P_{tx}$ of the current data frame and the actual reception signal power $P_{rx\_rssi}$; namely, $P_{loss}=P_{tx}-P_{rx\_rssi}$.

At S404, the maximum transmission power that does not affect the packet reception of the one or more second stations is calculated by using the path attenuation power $P_{loss}$ and the maximum allowed interference power of the overlapping basic service set $P_{obss\_max}$, namely, $P_{obss\_max\_tx}=P_{obss\_max}+P_{loss}$.

Figure 5:
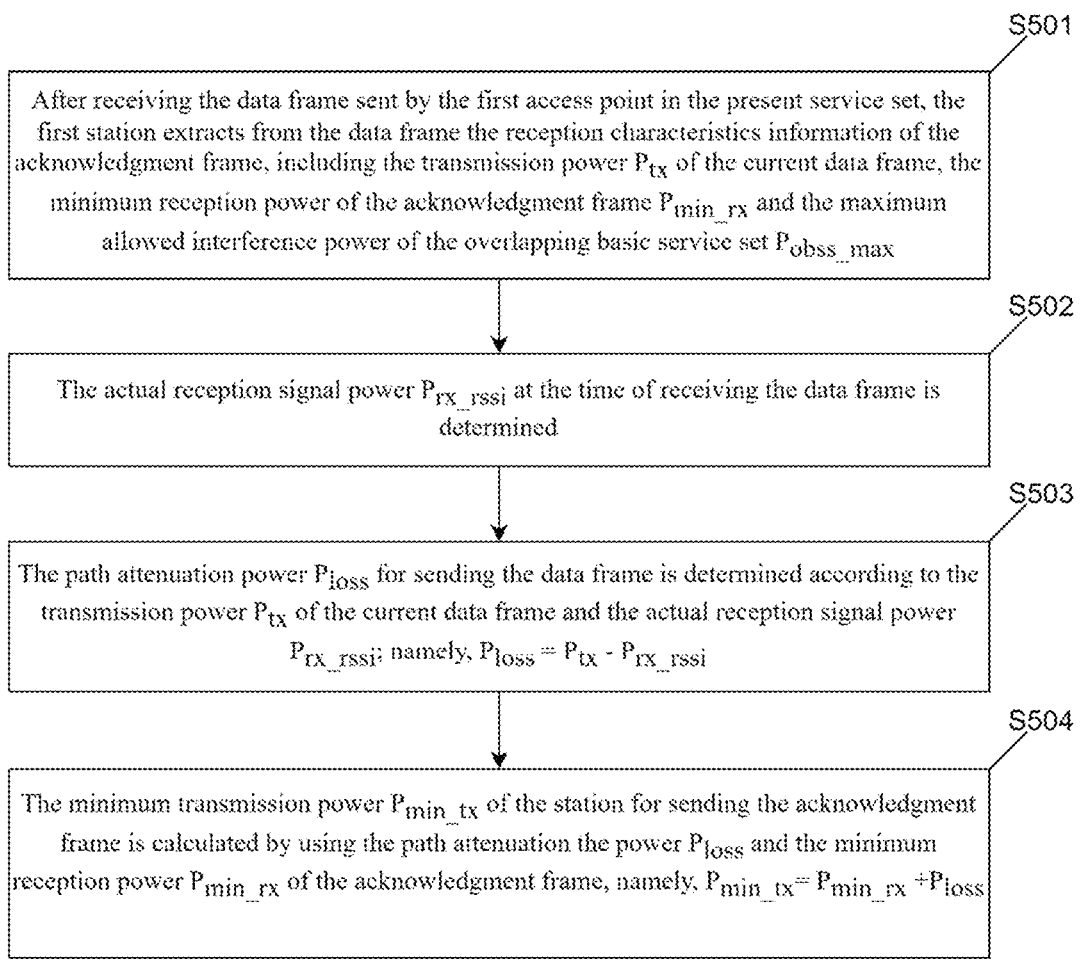
FIG. 5 schematically shows a flow chart of calculating a minimum transmission power of an acknowledgement frame.

If the data frame received by the first station is sent by the access point in the present service set, as mentioned above, the transmission power of the current data frame, the minimum reception power of the acknowledgment frame and the maximum allowed interference power of the overlapping basic service set are periodically given in turn in the SERVICE field transmitted by the access point. Referring to FIG. 5, which shows a flow chart of calculating the minimum transmission power of the acknowledgment frame in the case that the data frame is sent by the access point in the present service set. The process includes the following steps.

At S501, after receiving the data frame sent by the first access point in the present service set, the first station extracts from the data frame the reception characteristics information of the acknowledgment frame, including the transmission power $P_{tx}$ of the current data frame, the minimum reception power of the acknowledgment frame $P_{min\_rx}$ and the maximum allowed interference power of the overlapping basic service set $P_{obss\_max}$.

At S502, the actual reception signal power $P_{rx\_rssi}$ at the time of receiving the data frame is determined.

At S503, the path attenuation power Floss for sending the data frame is determined according to the transmission power $P_{tx}$ of the current data frame and the actual reception signal power $P_{rx\_rssi}$; namely, $P_{loss}=P_{tx}-P_{rx\_rssi}$.

At S504, the minimum transmission power $P_{min\_tx}$ of the station for sending the acknowledgment frame is calculated by using the path attenuation the power Floss and the minimum reception power $P_{min\_rx}$ of the acknowledgment frame, namely, $P_{min\_tx}=P_{min\_rx}+P_{loss}$.

Each station locally maintains a queue of the maximum transmission powers of the overlapping basic service set, for storing the set of maximum transmission powers which does not affect packet reception of one or more second stations and which is calculated after the present station receives a data frame sent by the one or more second stations in the overlapping basic service set.

As a specific implementation, the queue of the maximum transmission powers of the overlapping basic service set is a queue with a preset length. After receiving the data frame sent by one or more second stations in the overlapping basic service set, the first station calculates the maximum transmission power which does not affect the packet reception of the one or more second stations; it is determined whether the data of the queue of the maximum transmission powers of the overlapping basic service set is full; if not, the calculated maximum transmission power is put into the queue; if yes, the maximum value in the queue of the maximum transmission powers of the overlapping basic service set $P_{obss\_max\_tx}$ is compared with the currently calculated maximum transmission power, and the smaller value of the two is put into the queue.

In addition, each maximum transmission power stored in the queue of the maximum transmission powers of the overlapping basic service set has a survival cycle, and upon expiration of the survival cycle, the corresponding maximum transmission power is removed from the queue of the maximum transmission powers of the overlapping basic service set. For example, the survival cycle can be selected as 100 milliseconds.

After receiving the data frame, the station may determine the transmission power of the acknowledgment frame according to the queue of the maximum transmission powers of the overlapping basic service set that is maintained by the station, and send the acknowledgment frame with the determined transmission power of the acknowledgment frame.

Figure 6:
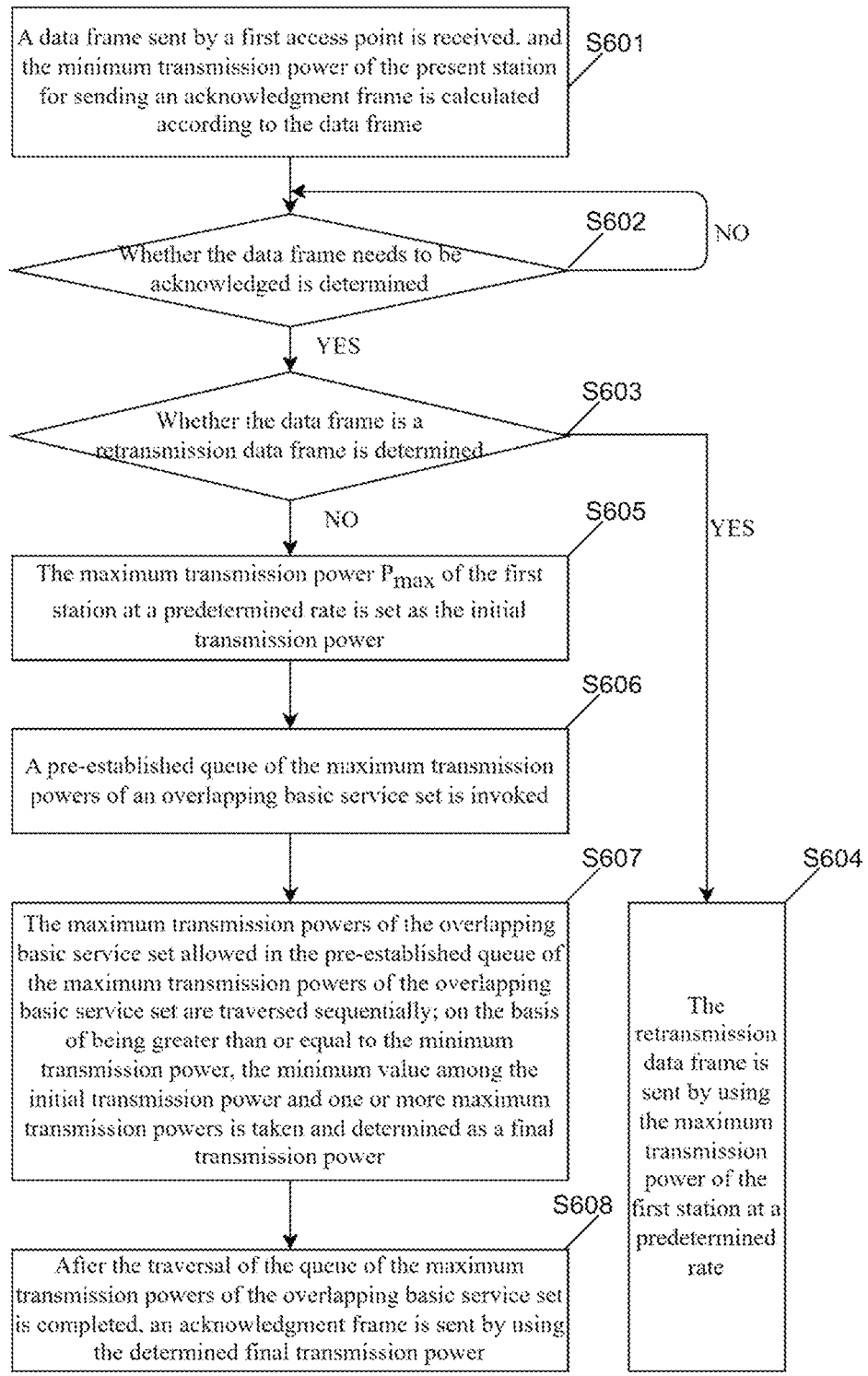
FIG. 6 schematically shows a flow chart of another specific embodiment of determining a transmission power of an acknowledgment frame provided by the present application.

FIG. 6 shows a flow chart of another specific embodiment of determining a transmission power of an acknowledgment frame provided by the present application. Specifically, the process includes the following steps.

At S601, a data frame sent by a first access point is received, and the minimum transmission power of the present station for sending an acknowledgment frame is calculated according to the data frame.

At S602, whether the data frame needs to be acknowledged is determined; if yes, proceed to S603; if not, return to S601.

At S603, whether the data frame is a retransmission data frame is determined; if yes, proceed to S604; if not, proceed to S605.

At S604, the retransmission data frame is sent by using the maximum transmission power of the first station at a predetermined rate.

For the acknowledgment to the retransmission of the frame, the data frame is sent according to the maximum transmission power of the station at a predetermined rate, which can give priority to ensuring the communication between the station per se and the access point.

At S605, the maximum transmission power $P_{max}$ of the first station at a predetermined rate is set as the initial transmission power, namely, $P_{tx}=P_{max}$.

At S606, a pre-established queue of the maximum transmission powers of an overlapping basic service set is invoked; the queue of the maximum transmission powers of the overlapping basic service set is a set of maximum transmission powers which does not affect packet reception of one or more second stations and which is calculated after the first station receives a data frame sent by the one or more second stations in the overlapping basic service set.

At S607, the maximum transmission powers of the overlapping basic service set allowed in the pre-established queue of the maximum transmission powers of the overlapping basic service set are traversed sequentially; on the basis of being greater than or equal to the minimum transmission power, the minimum value among the initial transmission power and one or more maximum transmission powers is taken and determined as a final transmission power.

At S608, after the traversal of the queue of the maximum transmission powers of the overlapping basic service set is completed, an acknowledgment frame is sent by using the determined final transmission power.

In order to reduce the interference to OBSS, the station will limit the transmission power of the acknowledgment frame. The lack of feedback mechanism will affect the normal communication between an access point and a station within the same BSS. Therefore, on the basis of any of the foregoing embodiments, the method for sending the acknowledgment frame provided in the present application may further include an operation of feedback control. The access point counts the success rate of receiving the acknowledgment frame after sending the frame, and calculates a ratio of ACK Timeout and ACK FCS error. Then, according to the success rate, the minimum reception power P min_rx of the acknowledgment frame is corrected. A specific feedback control method is: calculating the reception error rate of the acknowledgment frame which is received after the access point sends the data frame; and correcting the minimum reception power of the acknowledgment frame based on the calculated reception error rate of the acknowledgment frame according to a formula of $P_{min\_rx}=P_{min\_rx\_base}+a*E$, wherein $P_{min\_rx}$ is the corrected minimum transmission power of the acknowledgment frame, $P_{min\_rx}$ base is a reference value, a is a constant, and E is the reception error rate of the acknowledgment frame.

Figure 7:
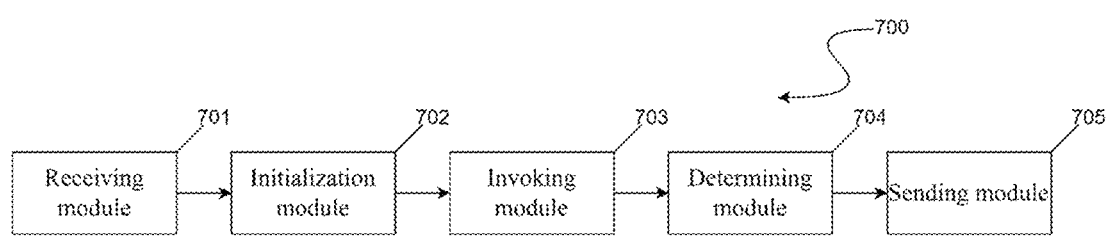
FIG. 7 schematically shows a flow chart of a specific embodiment of an apparatus for sending an acknowledgment frame provided by the present application.

In addition, the present application further provides an apparatus for sending an acknowledgment frame, as shown in a structural block diagram of a specific implementation of the apparatus for sending the acknowledgment frame provided in FIG. 7 of the present application, the apparatus 700 includes a receiving module 701, an initialization module 702, an invoking module 703, a determining module 704 and a sending module 705.

The receiving module is configured to receive a data frame sent by a first access point, and to calculate a minimum transmission power of the present station for sending an acknowledgment frame according to the data frame.

The initialization module is configured to take a maximum transmission power of the first station at a predetermined rate as an initial transmission power.

The invoking module is configured to invoke a pre-established queue for maximum transmission powers of an overlapping basic service set; the queue of the maximum transmission powers of the overlapping basic service set being a set of maximum transmission powers which does not affect packet reception of one or more second stations and which is calculated by the first station after receiving a data frame sent by the one or more second stations in the overlapping basic service set.

The determining module is configured to traverse the maximum transmission powers of the overlapping basic service set allowed in the pre-established queue of the maximum transmission powers of the overlapping basic service set sequentially; on the basis of being greater than or equal to the minimum transmission power, to take a minimum value among the initial transmission power and one or more maximum transmission powers to be determined as a final transmission power.

The sending module is configured to send an acknowledgment frame by using the determined final transmission power.

Figure 8:
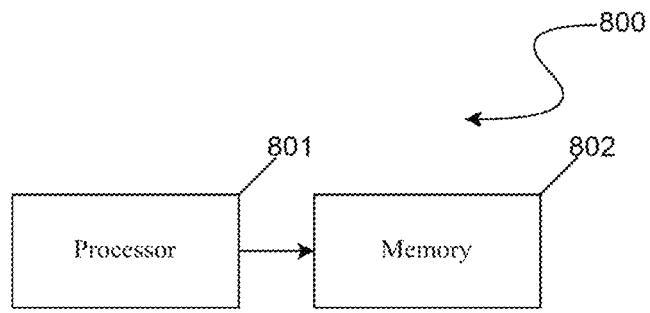
FIG. 8 schematically shows a structural block diagram of a station provided by the present application.

In addition, the present application further provides a station, as shown in a block diagram of the structure of the station provided in FIG. 8 of the present application, the station 800 includes a processor 801 and a memory 802; wherein the memory is configured to store program instructions; the processor is configured to perform the operation of any one of the above methods for sending an acknowledgment frame according to the program instructions.

In addition, the present disclosure further provides a computer-readable storage medium storing program instructions, which when being executed, perform the operation of any one of the above methods for sending an acknowledgment frame.

It can be understood that the apparatus, the station and the computer-readable storage medium for sending the acknowledgment frame provided in the present application correspond to the method for sending the acknowledgment frame described above, of which the specific embodiments can be referred to the content of the above method parts, and will not be repeated here.

The present application can reduce interference to the packet reception at the nodes in the overlapping basic service set and improve the quality of communication in high-density areas without affecting the success rate of the original data interaction.

While various embodiments of various aspects of the invention have been described for the purpose of the disclosure, it shall not be understood that the teaching of the disclosure is limited to these embodiments. The features disclosed in a specific embodiment are therefore not limited to that embodiment, but may be combined with the features disclosed in different embodiments. For example, one or more features and/or operations of the method according to the present application described in one embodiment may also be applied individually, in combination or as a whole in another embodiment. It can be understood by those skilled in the art that more optional embodiments and variations are possible, and that various changes and modifications may be made to the system described above, without departing from the scope defined by the claims of the present disclosure.

What is claimed is:

1. A method for sending an acknowledgment frame, applied to a first station of wireless communication, the method comprising:
    receiving a data frame sent by a first access point, and calculating a minimum transmission power of the first station for sending an acknowledgment frame according to the data frame;
    using a maximum transmission power of the first station at a predetermined rate as an initial transmission power;
    invoking a pre-established queue of maximum transmission powers of an overlapping basic service set; the queue of the maximum transmission powers of the overlapping basic service set being a set of maximum transmission powers which does not affect packet reception of one or more second stations and which is calculated by the first station after receiving a data frame sent by the one or more second stations in the overlapping basic service set;
    traversing the maximum transmission powers of the overlapping basic service set allowed in the pre-established queue of the maximum transmission powers of the overlapping basic service set sequentially; on the basis of being greater than or equal to the minimum transmission power, taking a minimum value among the initial transmission power and one or more maximum transmission powers to be determined as a final transmission power; and
    sending the acknowledgment frame by using the determined final transmission power.

2. The method for sending an acknowledgment frame according to claim 1, after receiving the data frame, further comprising:
    determining whether the data frame is a retransmission data frame;
    in response to the data frame being a retransmission data frame, sending the retransmission data frame using the maximum transmission power of the first station at a predetermined rate;
    in response to the data frame not being a retransmission data frame, performing a subsequent operation of using the maximum transmission power of the first station at a predetermined rate as the initial transmission power.

3. The method for sending an acknowledgment frame according to claim 1, wherein the queue of the maximum transmission powers of the overlapping basic service set is a queue with a preset length; and the method further comprises:

calculating the maximum transmission power which does not affect packet reception of one or more second stations by the first station after receiving the data frame sent by the one or more second stations in the overlapping basic service set;

determining whether the data in the queue of the maximum transmission powers of the overlapping basic service set is full;

in response to the data in the queue of the maximum transmission powers of the overlapping basic service set not being full, putting the calculated maximum transmission power into the queue;

in response to the data in the queue of the maximum transmission powers of the overlapping basic service set being full, comparing a maximum value in the queue of the maximum transmission powers of the overlapping basic service set with the currently calculated maximum transmission power, and putting a smaller value of the two into the queue.

4. The method for sending an acknowledgment frame according to claim 3, wherein each maximum transmission power stored in the queue of the maximum transmission powers of the overlapping basic service set has a survival cycle, and upon expiration of the survival cycle, a corresponding maximum transmission power is removed from the queue of the maximum transmission powers of the overlapping basic service set.

5. The method for sending an acknowledgment frame according to claim 1, wherein the calculating the maximum transmission power which does not affect packet reception of one or more second stations by the first station after receiving the data frame sent by the one or more second stations in the overlapping basic service set comprises:

after receiving the data frame sent by the one or more second stations in the overlapping basic service set, the first station extracting from the data frame a reception characteristics information of the acknowledgment frame, the reception characteristics information of the acknowledgment frame at least comprising a transmission power of the current data frame and a maximum allowed interference power of the overlapping basic service set;

determining an actual reception signal power at the time of receiving the data frame;

determining a path attenuation power for sending the data frame according to the transmission power of the current data frame and the actual reception signal power; and calculating the maximum transmission power that does not affect packet reception of the one or more second stations by using the path attenuation power and the maximum allowed interference power of the overlapping basic service set.

6. The method for sending an acknowledgment frame according to claim 1, wherein the calculating the minimum transmission power of the first station for sending an acknowledgment frame according to the data frame comprises:

after receiving a data frame sent by the first access point in the present basic service set, the first station extracting from the data frame a reception characteristics information of the acknowledgment frame, the reception characteristics information of the acknowledgment frame at least comprising a transmission power of the current data frame, a minimum reception power of the acknowledgment frame and a maximum allowed interference power of the overlapping basic service set;

determining an actual reception signal power at the time of receiving the data frame;

determining a path attenuation power for sending the data frame according to the transmission power of the current data frame and the actual reception signal power; and calculating the minimum transmission power for sending the acknowledgment frame at the first station by using the path attenuation power and the minimum reception power of the acknowledgment frame.

7. The method for sending an acknowledgment frame according to claim 6, the reception characteristics information of the acknowledgment frame is carried in a SERVICE field of the data frame transmitted by the station or the access point.

8. The method for sending an acknowledgment frame according to claim 1, further comprising:

calculating a reception error rate of the acknowledgment frame which is received after the access point sending the data frame;

correcting a minimum reception power of the acknowledgment frame according to a formula of $P_{min\_rx}=P_{min\_rx\_base}+a*E$ based on the calculated reception error rate of the acknowledgment frame, wherein $P_{min\_rx}$ is a corrected minimum transmission power of the acknowledgment frame, $P_{min\_rx\_base}$ is a reference value, a is a constant, and E is the reception error rate of the acknowledgment frame.

9. A station comprising a processor and a memory, the memory being configured to store program instructions;

the processor being configured to perform operations of the method for sending an acknowledgment frame according to the program instructions, the method comprising:

receiving a data frame sent by a first access point, and calculating a minimum transmission power of the first station for sending an acknowledgment frame according to the data frame;

using a maximum transmission power of the first station at a predetermined rate as an initial transmission power;

invoking a pre-established queue of maximum transmission powers of an overlapping basic service set; the queue of the maximum transmission powers of the overlapping basic service set being a set of maximum transmission powers which does not affect packet reception of one or more second stations and which is calculated by the first station after receiving a data frame sent by the one or more second stations in the overlapping basic service set;

traversing the maximum transmission powers of the overlapping basic service set allowed in the pre-established queue of the maximum transmission powers of the overlapping basic service set sequentially; on the basis of being greater than or equal to the minimum transmission power, taking a minimum value among the initial transmission power and one or more maximum transmission powers to be determined as a final transmission power; and sending the acknowledgment frame by using the determined final transmission power.

10. The station according to claim 9 wherein after receiving the data frame, the method further comprises: determining whether the data frame is a retransmission data frame; in response to the data frame being a retransmission data frame, sending the retransmission data frame using the maximum transmission power of the first station at a predetermined rate; in response to the data frame not being a retransmission data frame, performing a subsequent operation of using the maximum transmission power of the first station at a predetermined rate as the initial transmission power.

11. The station according to claim 9, wherein the queue of the maximum transmission powers of the overlapping basic service set is a queue with a preset length; and the method further comprises:
calculating the maximum transmission power which does not affect packet reception of one or more second stations by the first station after receiving the data frame sent by the one or more second stations in the overlapping basic service set;
determining whether the data in the queue of the maximum transmission powers of the overlapping basic service set is full;
in response to the data in the queue of the maximum transmission powers of the overlapping basic service set not being full, putting the calculated maximum transmission power into the queue;
in response to the data in the queue of the maximum transmission powers of the overlapping basic service set being full, comparing a maximum value in the queue of the maximum transmission powers of the overlapping basic service set with the currently calculated maximum transmission power, and putting a smaller value of the two into the queue.

12. The station according to claim 11, wherein each maximum transmission power stored in the queue of the maximum transmission powers of the overlapping basic service set has a survival cycle, and upon expiration of the survival cycle, a corresponding maximum transmission power is removed from the queue of the maximum transmission powers of the overlapping basic service set.

13. The station according to claim 9, wherein the calculating the maximum transmission power which does not affect packet reception of one or more second stations by the first station after receiving the data frame sent by the one or more second stations in the overlapping basic service set comprises:
after receiving the data frame sent by the one or more second stations in the overlapping basic service set, the first station extracting from the data frame a reception characteristics information of the acknowledgment frame, the reception characteristics information of the acknowledgment frame comprising at least a transmission power of the current data frame and a maximum allowed interference power of the overlapping basic service set;
determining an actual reception signal power at the time of receiving the data frame;
determining a path attenuation power for sending the data frame according to the transmission power of the current data frame and the actual reception signal power; and
calculating the maximum transmission power that does not affect packet reception of the one or more second stations by using the path attenuation power and the maximum allowed interference power of the overlapping basic service set.

14. The station according to claim 9, wherein the calculating the minimum transmission power of the first station for sending an acknowledgment frame according to the data frame comprises:
after receiving a data frame sent by the first station in the present basic service set, the first station extracting from the data frame a reception characteristics information of the acknowledgment frame, the reception characteristics information of the acknowledgment frame comprising at least a transmission power of the current data frame, a minimum reception power of the acknowledgment frame and a maximum allowed interference power of the overlapping basic service set;
determining an actual reception signal power at the time of receiving the data frame;
determining a path attenuation power for sending the data frame according to the transmission power of the current data frame and the actual reception signal power; and
calculating the minimum transmission power for sending the acknowledgment frame at the first station by using the path attenuation power and the minimum reception power of the acknowledgment frame.

15. The station according to claim 14, the reception characteristics information of the acknowledgment frame is carried in a SERVICE field of the data frame transmitted by the station or the access point.

16. The station according to claim 9, wherein the method further comprising:
calculating a reception error rate of the acknowledgment frame which is received after the access point sending the data frame;
correcting a minimum reception power of the acknowledgment frame according to a formula of $P_{min\_rx}=P_{min\_rx\_base}+a*E$ based on the calculated reception error rate of the acknowledgment frame, wherein, $P_{min\_rx}$ is a corrected minimum transmission power of the acknowledgment frame, $P_{min\_rx\_base}$ is a reference value, a is a constant, and E is the reception error rate of the acknowledgment frame.

17. A non-transitory computer-readable storage medium storing program instructions, the program instructions, which when being executed, perform operations of the method for sending an acknowledgment frame, the method comprising:
receiving a data frame sent by a first access point, and calculating a minimum transmission power of the first station for sending an acknowledgment frame according to the data frame;
using a maximum transmission power of the first station at a predetermined rate as an initial transmission power;
invoking a pre-established queue of maximum transmission powers of an overlapping basic service set; the queue of the maximum transmission powers of the overlapping basic service set being a set of maximum transmission powers which does not affect packet reception of one or more second stations and which is calculated by the first station after receiving a data frame sent by the one or more second stations in the overlapping basic service set;
traversing the maximum transmission powers of the overlapping basic service set allowed in the pre-established queue of the maximum transmission powers of the overlapping basic service set sequentially; on the basis of being greater than or equal to the minimum transmission power, taking a minimum value among the initial transmission power and one or more maximum transmission powers to be determined as a final transmission power; and
sending the acknowledgment frame by using the determined final transmission power.

18. The non-transitory computer-readable storage medium according to claim 17, wherein after receiving the data frame, the method further comprises:
- determining whether the data frame is a retransmission data frame;
- in response to the data frame being a retransmission data frame, sending the retransmission data frame using the maximum transmission power of the first station at a predetermined rate;
- in response to the data frame not being a retransmission data frame, performing a subsequent operation of using the maximum transmission power of the first station at a predetermined rate as the initial transmission power.

19. The non-transitory computer-readable storage medium according to claim 17, wherein the queue of the maximum transmission powers of the overlapping basic service set is a queue with a preset length; and the method further comprises:
- calculating the maximum transmission power which does not affect packet reception of one or more second stations by the first station after receiving the data frame sent by the one or more second stations in the overlapping basic service set;
- determining whether the data in the queue of the maximum transmission powers of the overlapping basic service set is full;
- in response to the data in the queue of the maximum transmission powers of the overlapping basic service set not being full, putting the calculated maximum transmission power into the queue;
- in response to the data in the queue of the maximum transmission powers of the overlapping basic service set being full, comparing a maximum value in the queue of the maximum transmission powers of the overlapping basic service set with the currently calculated maximum transmission power, and putting a smaller value of the two into the queue.

20. The non-transitory computer-readable storage medium according to claim 19, wherein each maximum transmission power stored in the queue of the maximum transmission powers of the overlapping basic service set has a survival cycle, and upon expiration of the survival cycle, a corresponding maximum transmission power is removed from the queue of the maximum transmission powers of the overlapping basic service set.

* * * * *